W. O. KEELING.
PISTON AND PISTON RINGS.
APPLICATION FILED SEPT. 7, 1920.
1,387,272.
Patented Aug. 9, 1921.
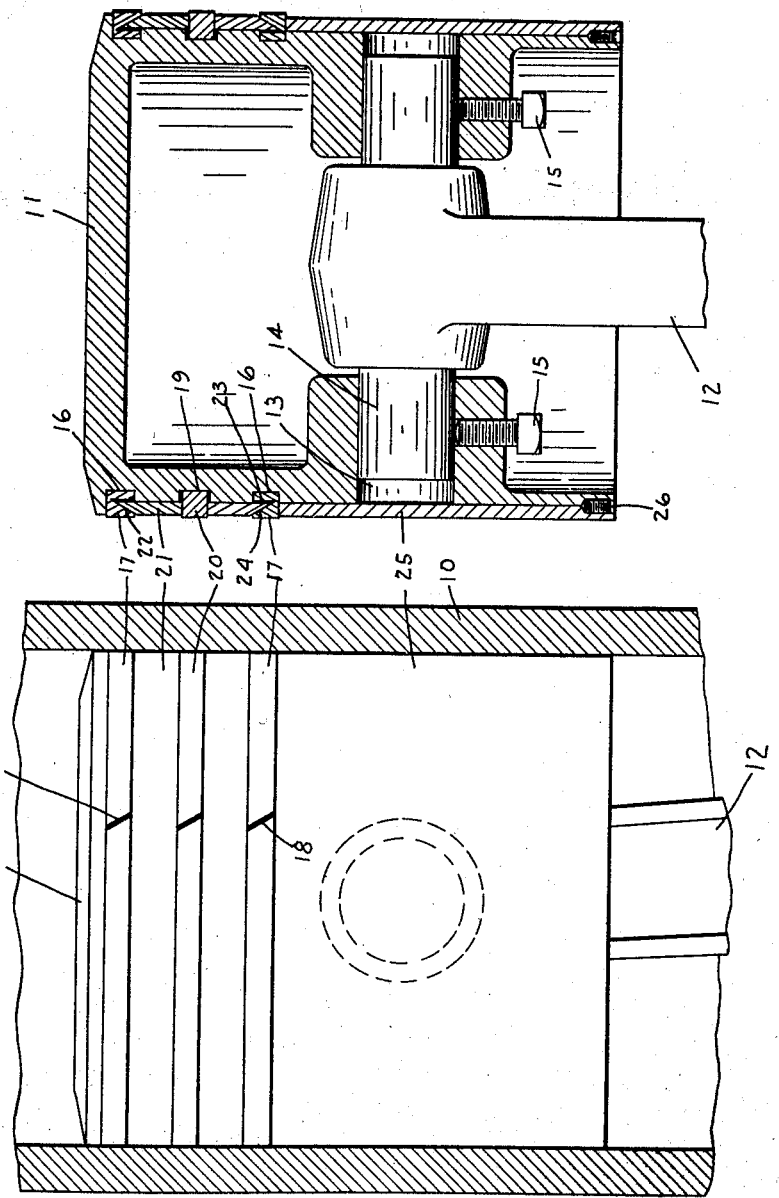
INVENTOR.
WILLIAM OREN KEELING
BY
ATTORNEYS

UNITED STATES PATENT OFFICE.

WILLIAM OREN KEELING, OF FRANKLIN, INDIANA.

PISTON AND PISTON-RINGS.

1,387,272. Specification of Letters Patent. Patented Aug. 9, 1921.

Application filed September 7, 1920. Serial No. 408,417.

*To all whom it may concern:*

Be it known that I, WILLIAM OREN KEELING, a citizen of the United States, and a resident of Franklin, county of Johnson, and State of Indiana, have invented a certain new and useful Piston and Piston-Rings; and I do hereby declare that the following is a full, clear, and exact description thereof, reference being had to the accompanying drawings, in which like numerals refer to like parts.

This invention relates to expansible piston rings and means for expanding the same.

The chief object of this invention is to provide a piston with piston rings which are positively expanded, so that said rings conform to the cylinder wall inclosing the piston to form a leak-proof joint between said piston and the cylinder wall.

The chief feature of the invention consists in providing a plurality of expansible piston rings and associating with the same a plurality of cam means for expanding said piston rings such that at all times one or more of said piston rings will be expanded into engagement with the cylinder wall to prevent leakage.

One feature of the invention consists in providing a single means for expanding one or more of said piston rings.

Another feature of the invention is in providing means associated with the piston whereby scoring of the piston is positively prevented.

The full nature of the invention will be understood from the accompanying drawings and the following description and claims.

In the drawings, Figure 1 is an elevational view of a piston embodying the invention and a cylinder, the latter being shown in section. Fig. 2 is a cross sectional view and illustrates the invention in detail.

In the drawings 10 indicates a cylinder wall and 11 a piston reciprocatorily mounted within said cylinder and provided with a piston rod 12. The body portion of the piston 11 is suitably journaled at 13 to receive the wrist pin 14 of the piston rod 12, said wrist pin being secured in said journal by suitable means, such as the set screws 15. Upon the cylindrical periphery of the piston there is formed a plurality of annular parallel grooves 16, each being adapted to receive an expansible piston ring member 17, said expansible piston ring member, as illustrated in Fig. 1, being split at 18. Associated with each pair of annular grooves 16 and positioned intermediate the same is a parallel groove 19 adapted to receive a ring which has been termed the cam ring 20. The respective rings 17 and 20 project from the body of the piston, and interposed between each piston 17 and the intermediate cam ring 20 is a non-expansible sleeve member 21, said sleeve member being provided with a beveled face 22. Each of the rings 17 upon the adjacent faces is provided with a groove 23, said groove having one wall inclined as at 24 and being adapted to receive the inclined or tapered wedge-faced sleeve 21.

As shown clearly in Fig. 2, the groove 19 is wider than the intermediate cam ring 20, and it will be understood that said ring is adapted to reciprocate in said widened or elongated groove 19. Since the wedge-faced sleeves 21 are non-expansible, the piston 10 is of reduced diameter throughout the intermediate portions of its surface, and associated with said reduced portion is a slot or non-expansible sleeve member 25, said sleeve member being rigidly secured to said piston body portion by suitable means, such as the screws 26.

As illustrated in Fig. 2, the sleeve member, in addition to complementing the piston body portion as described, also is adapted to prevent scoring of the cylinder by closing the journals 13 which will protect said cylinder wall from the wrist pin 14 should the same become disengaged from the screw means 15.

The operation of the expansible piston rings may be readily understood with reference to Fig. 2. When the piston 11 reciprocates in the cylinder 10, the split expansible piston ring 20, heretofore termed the cam ring, is engaged by the cylinder wall and is retarded by frictional engagement with said wall. This retardation causes the ring 20 to move longitudinally of the piston in the slot 19, and simultaneously therewith move the adjacent and abutting solid wedge-faced sleeve into the complementarily formed groove 23, whereupon the inclined faces 22 and 24 of the sleeve 21 and ring 17 respectively engage with each other, and said ring 17 is forced outwardly into engagement with the cylinder wall. Upon the reverse movement of the piston, the other wedge-faced sleeve member is similarly actuated to force the other expansible ring into engagement with said wall. While but two expansible piston rings have been herein illustrated with a single means for actuating either of said rings as shown, it will be understood that each of said expansible piston ring means may be provided with a cam ring and a wedge-shaped member without departing from the broad principle of the invention. Similarly, although a single expansible unit has been illustrated, it will be understood that a plurality or more of said units may be used as required. From the foregoing it will be noted that a relatively leak-proof joint is provided between the piston and cylinder, since there are a plurality of direction changes, which in turn sufficiently retards the escape of oil from the crankcase so as to make the joint oil leakage proof, which in internal combustion engines reduces the usual spark plug fouling to a minimum.

The invention claimed is:

1. A piston including a body portion provided with an annular groove, an expansible piston ring seatable in said groove and provided with a cam surface, and a cam member operable by said piston and cylinder by the movement of the former for expanding said expansible piston ring.

2. A piston including a body portion, a pair of expansible piston rings seatable in said body portion, and cam means operable by the movement of said piston in said cylinder for expanding either of said piston rings.

3. A piston including a body portion, a pair of expansible piston rings seatable in said body portion, means associated with each of said piston rings for expanding the same, and a single means for actuating either of said expanding means, said single means being operable by the relative movement of said piston in said cylinder.

4. A piston including a body portion, an expansible piston ring seatable in said body portion and provided with an inclined groove, a non-expansible sleeve member concentric with said piston and movable longitudinally thereof, said sleeve member having an inclined face adapted to engage said inclined groove for expanding said piston ring, means operable by the relative movement of said piston in said cylinder for reciprocating said wedge-faced sleeve, and sleeve means associated with said piston body portion to enlarge the same, so that the piston will substantially occupy the entire cylinder circumference, said last mentioned sleeve preventing scoring of the cylinder.

In witness whereof, I have hereunto affixed my signature.

WILLIAM OREN KEELING.